(12) United States Patent  (10) Patent No.: US 7,924,165 B2
Vinano, Jr. et al.  (45) Date of Patent: Apr. 12, 2011

(54) ELECTRONIC SHARK DETERRENT

(75) Inventors: Wilson Vinano, Jr., Honolulu, HI (US);
Calvin Maeda, Honolulu, HI (US);
Gary Maeda, Torrance, CA (US);
Dwight Oda, Rancho Palos Verdes, CA (US)

(73) Assignee: ZTOA Innovations, LLC, Honolulu, HI (US)

( * ) Notice: Subject to any disclaimer, the term of this patent is extended or adjusted under 35 U.S.C. 154(b) by 383 days.

(21) Appl. No.: 12/238,185

(22) Filed: Sep. 25, 2008

(65) Prior Publication Data

US 2010/0071631 A1   Mar. 25, 2010

(51) Int. Cl.
*G08B 23/00* (2006.01)

(52) U.S. Cl. ............ 340/573.3; 119/219; 119/720; 119/220; 340/540

(58) Field of Classification Search ............ 119/220, 119/713, 721, 720; 441/74; 340/573.3, 540; 607/58; 102/502
See application file for complete search history.

(56) References Cited

U.S. PATENT DOCUMENTS

| | | | | |
|---|---|---|---|---|
| 5,491,483 A * | 2/1996 | D'Hont | | 342/42 |
| 5,565,846 A * | 10/1996 | Geiszler et al. | | 340/572.2 |
| 6,191,691 B1 * | 2/2001 | Serrault | | 340/572.8 |
| 6,264,106 B1 * | 7/2001 | Bridgelall | | 235/462.46 |
| 6,302,461 B1 * | 10/2001 | Debras et al. | | 294/68.1 |
| 7,511,611 B2 * | 3/2009 | Sabino et al. | | 340/500 |
| 2006/0273180 A1 * | 12/2006 | Ammond et al. | | 235/492 |
| 2008/0094224 A1 * | 4/2008 | Parker et al. | | 340/572.8 |

* cited by examiner

*Primary Examiner* — Benjamin C Lee
*Assistant Examiner* — Peter C Mehravari
(74) *Attorney, Agent, or Firm* — Leighton K. Chong

(57) ABSTRACT

An Electronic Shark Deterrent provides protection from, and for, sharks and other aquatic creatures. Compact low power circuitry generates high voltage periodic pulse train bursts, disturbing the electroreceptors of the aquatic Elasmobranchi subclass. A train of thirty 33 us 250 Volt (V) electric pulses lasting one second is produced every six seconds. The device is fully portable, requiring no bulky activity impeding buoys, cords, or external power supplies. Advanced circuitry is compact enough to be worn on a watch sized band or attached to garments and recreation or safety equipment. The deterrent can be used in a fixed configuration to protect fish farms and vacation resort swimming areas. It can be affixed to offshore oil rigs and research stations to protect workers. The Electronic Shark Deterrent is compact and portable enough to be used on longlines, trawls and gillnets to reduce the numbers of endangered aquatic creatures unnecessarily destroyed as bycatch.

17 Claims, 3 Drawing Sheets

ELECTRONIC SHARK DETERRENT

BACKGROUND

1. Field

The presently disclosed embodiments relate generally to devices for deterring dangerous creatures, and more specifically to an electronic shark deterrent.

2. Background

Each year there are about fifty to seventy confirmed shark attacks and five to fifteen shark-attack fatalities around the world. The numbers have risen over the past several decades but not because sharks are more aggressive: Humans have simply taken to coastal waters in increasing numbers. While sharks kill fewer than twenty people a year, their own numbers suffer greatly at human hands. Between twenty and one hundred million sharks die each year due to fishing activity, according to data from the Florida Museum of Natural History's International Shark Attack File.

Most attacks occur in nearshore waters, typically inshore of a sandbar or between sandbars where sharks feed and can become trapped at low tide. Areas with steep drop offs are also likely attack sites. Sharks congregate in these areas because their natural food items also congregate in these areas.

There are three major kinds of unprovoked shark attacks. By far the most common are "hit and run" attacks. "Hit and run" attacks typically occur in the surf zone with swimmers and surfers being the normal targets. The victim seldom sees its attacker and the shark does not return after inflicting a single bite or slash wound. In most instances, these are probably cases of mistaken identity that occur under conditions of poor water visibility and a harsh physical environment (breaking surf and strong wash/current conditions). A feeding shark in this habitat must make quick decisions and rapid movements to capture its traditional food items. When these difficult physical conditions are considered in conjunction with provocative human appearance and activities associated with aquatic recreation (splashing, shiny jewelry, contrasting colored swimsuits, contrasting tanning, especially involving the soles of the feet), it is not surprising that sharks might occasionally misinterpret a human for its normal prey. Upon biting, the shark quickly realizes that the human is a foreign object, or that it is too large, and immediately releases the victim and does not return. Some of these attacks could also be related to social behaviors unrelated to feeding, such as dominance behaviors seen in many land animals. Injuries to "hit and run" victims are usually life-threatening.

"Bump and bite" attacks and "sneak" attacks, while less common, result in greater injuries and most fatalities. These types of attack usually involve divers or swimmers in somewhat deeper waters, but occur in nearshore shallows in some areas of the world. "Bump and bite" attacks are characterized by the shark initially circling and often bumping the victim prior to the actual attack. "Sneak" attacks differ in having the strike occur without warning. In both cases, unlike the pattern for "hit and run" attacks, repeat attacks are not uncommon and multiple or sustained bites are the norm. Injuries incurred during this type of attack are usually quite severe, frequently resulting in death. These types of attack are the probable result of feeding or antagonistic behaviors rather than cases of mistaken identity. Most shark attacks involving sea disasters, e.g. plane and ship accidents, probably involve "bump and bite" and "sneak" attacks. Almost any large shark, roughly two meters or longer in total length, is a potential threat to humans.

Likewise, sharks and other aquatic creatures are frequently injured and killed by human activities. When commercial fishermen catch animals that are not their desired catch, they call those animals "bycatch." These unwanted animals are then thrown back overboard dead, dying, or injured. An estimated fifty million sharks are caught unintentionally as bycatch in commercial fisheries every year. Some of the most troublesome fishing gears for sharks are longlines, trawls, and gillnets.

As many as one hundred million sharks are caught unintentionally as bycatch in commercial fisheries every year. Longlines, trawls, and gillnets prove to be some of the most problematic fishing methods, producing large numbers of shark bycatch. Often, these unintentionally caught sharks will illegally have their fins removed as the fins are too valuable for many fishermen to resist. Sharks can represent an unusually high percentage of the bycatch compared to other species because they are often the same size as the target species or they are attracted to the easy prey that have already been caught.

Longlines can extend eighty miles and have several thousand baited hooks attached to the line. Because longlines are set in the water and often left for extended periods, by the time the lines are taken in, the sharks and other marine life are often already dead. In cases when the sharks are still alive, to avoid a potentially dangerous situation, fishermen simply cut the sharks loose with line and hook still attached. Dragging huge nets, weighted by anchors, through the ocean or along the ocean floor is a method of fishing called trawling. This technique results in significant bycatch and habitat destruction. Gillnets are like invisible barriers hung in the water to catch fish by trapping and holding them. The fish become ensnared in the nets and when they try to escape by backing out, their gills become caught in the net. Unfortunately sharks and other non-targeted species also become entangled and are left to die. The World Wildlife fund estimates that twenty percent of shark species are endangered.

In addition to preventing harm to people from sharks and unintentional devastation of aquatic life by human activities, other applications for deterring sharks have emerged in today's environment. For example, fish farms and other commercial operations suffer significant loss of revenue due to normal feeding activity of aquatic creatures, while vacation resorts are increasingly safety conscious.

Various methods of deterring sharks have been attempted. Buoy devices, extended tethers, and the like have proven to be too bulky, non-portable, power inefficient or ineffective. Traditionally, deterrent devices having electronic pulses in the most effective 30 microsecond (us) range have not been viable due to power, voltage, and size constraints.

Thus, there is a need in the art for a low cost, compact, portable, power efficient, multi-purpose, effective device for deterring sharks and other aquatic creatures from harming people and causing commercial losses as well as for reducing bycatch and conserving our environment.

SUMMARY

Aspects and embodiments disclosed herein address the above-stated needs by providing a compact electronic shark deterrent device, which produces electronic pulses in the most effective 30 microsecond (us) range.

In one aspect, an Electronic Shark Deterrent apparatus comprises a low voltage power supply, a high voltage charging controller, a high voltage capacitor, at least one pair of probes and a processor for generating signals to cause the high voltage charging controller to charge and discharge the high voltage capacitor thereby creating an output waveform for transmission from the at least one pair of probes, wherein the output waveform comprises high voltage pulses in the range of 20 us to 100 us having a duration of one half to two and one half seconds repeated at regular intervals.

In an another aspect, a method for deterring sharks comprises activating electronic pulse burst generation, generating signals to cause a high voltage charging controller to synchronize the charging and discharging of a high voltage capacitor, charging and discharging the high voltage capacitor to create an output waveform comprising high voltage pulses in the range of 20 us to 100 us having a duration of one half to two and one half seconds repeated at regular intervals and transmitting the output wave form from probes in contact with water to deter sharks and other elasmobranchi from the vicinity of the probes.

In yet another aspect, a computer readable media embodies a method for deterring sharks comprising activating electronic pulse burst generation, generating signals to cause a high voltage charging controller to synchronize the charging and discharging of a high voltage capacitor, charging and discharging the high voltage capacitor to create an output waveform comprising high voltage pulses in the range of 20 us to 100 us having a duration of one half to two and one half seconds repeated at regular intervals and transmitting the output wave form from probes in contact with water to deter sharks and other elasmobranchi from the vicinity of the probes

BRIEF DESCRIPTION OF THE DRAWINGS

The features and nature of the present invention will become more apparent from the detailed description set forth below when taken in conjunction with the drawings in which like reference characters identify correspondingly throughout.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

The presently disclosed Electronic Shark Deterrent device provides protection from, and for, sharks and other aquatic creatures in a variety of applications. Compact low power circuitry generates high voltage periodic pulse train bursts, disturbing the electroreceptors of sharks, rays, skates, electric eels and other members of the aquatic Elasmobranchi subclass. Unpleasant nerve and muscle stimulation caused by the period pulse train bursts force sharks to cease any current behavior and immediately leave the vicinity of the high voltage emissions.

The disclosed Electronic Shark Deterrent is capable of producing a train of thirty 33 us 250 Volt (V) electric pulses lasting one second, every six seconds. The device is fully portable, requiring no bulky activity impeding buoys, cords, or external power supplies. Its advanced circuitry is compact enough to be worn on a watch sized band or attached to or embedded in bathing suits, wetsuits, rash guards or other garments intended for water sports. The compact device can be attached, or embedded in, aquatic recreation equipment such as surfboards, body boards, jet skis, water skis, rafts, canoes, or kayaks. The Electronic Shark Deterrent can be attached to any life jacket, life boat, or other marine or safety equipment.

The disclosed deterrent device can be used in any manner of fixed configuration to protect fish farms and other commercial enterprises such as protected swimming areas of vacation resorts. It can be affixed to offshore oil rigs and research stations to protect workers. At least as importantly, the Electronic Shark Deterrent is compact and portable enough to be used on longlines, trawls and gillnets to reduce the numbers of endangered aquatic creatures unnecessarily destroyed as bycatch.

The Electronic Shark Deterrent is comfortable and reasonably available to consumers for safer entry into water. In some embodiments, the Electronic Shark Deterrent is activated by a user with a button, magnet or on/off switch. In other embodiments the Electronic Shark Deterrent is activated automatically or by remote control switch for buoy, fish farming, protected swimming areas and commercial operation applications that do not require compact design. Remote control or automated interfaces may be activated by sonar, underwater video cameras with imaging, electric field detection or fiber optic cable interfaces.

Figure 1:
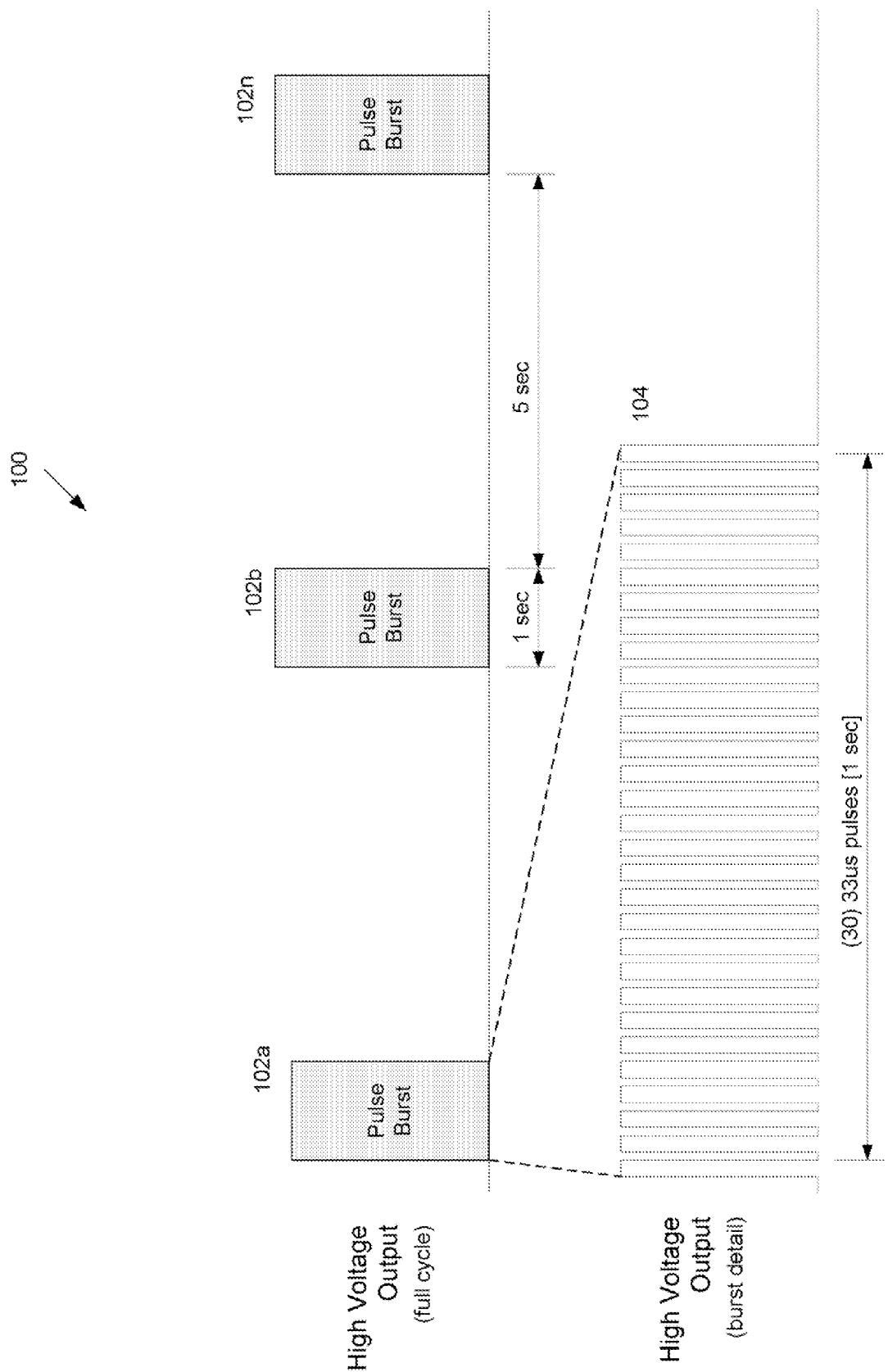
FIG. 1 is a diagram of an exemplary Electronic Shark Deterrent high voltage output waveform.

FIG. 1 is a diagram of an exemplary Electronic Shark Deterrent high voltage output waveform 100. In one embodiment, pulse bursts 102, having a duration of approximately 1 second, comprise thirty 33 us 200V negative edge pulses 104 repeated after a 5 second interval. In other embodiments, pulse bursts 102 may comprise 200-250V pulses 104 in the range of 20 us to 100 us having a duration of one half to two and one half seconds repeated at regular intervals. In yet another embodiment, the regular intervals may be between 2 and 10 seconds.

Pulse bursts 102 adversely stimulate nerve tissue and muscle contraction of the shark or other Elasmobranchi organism, causing it to avoid the pulse bursts 102 by vacating the vicinity of the Electronic Shark Deterrent device.

Figure 2:
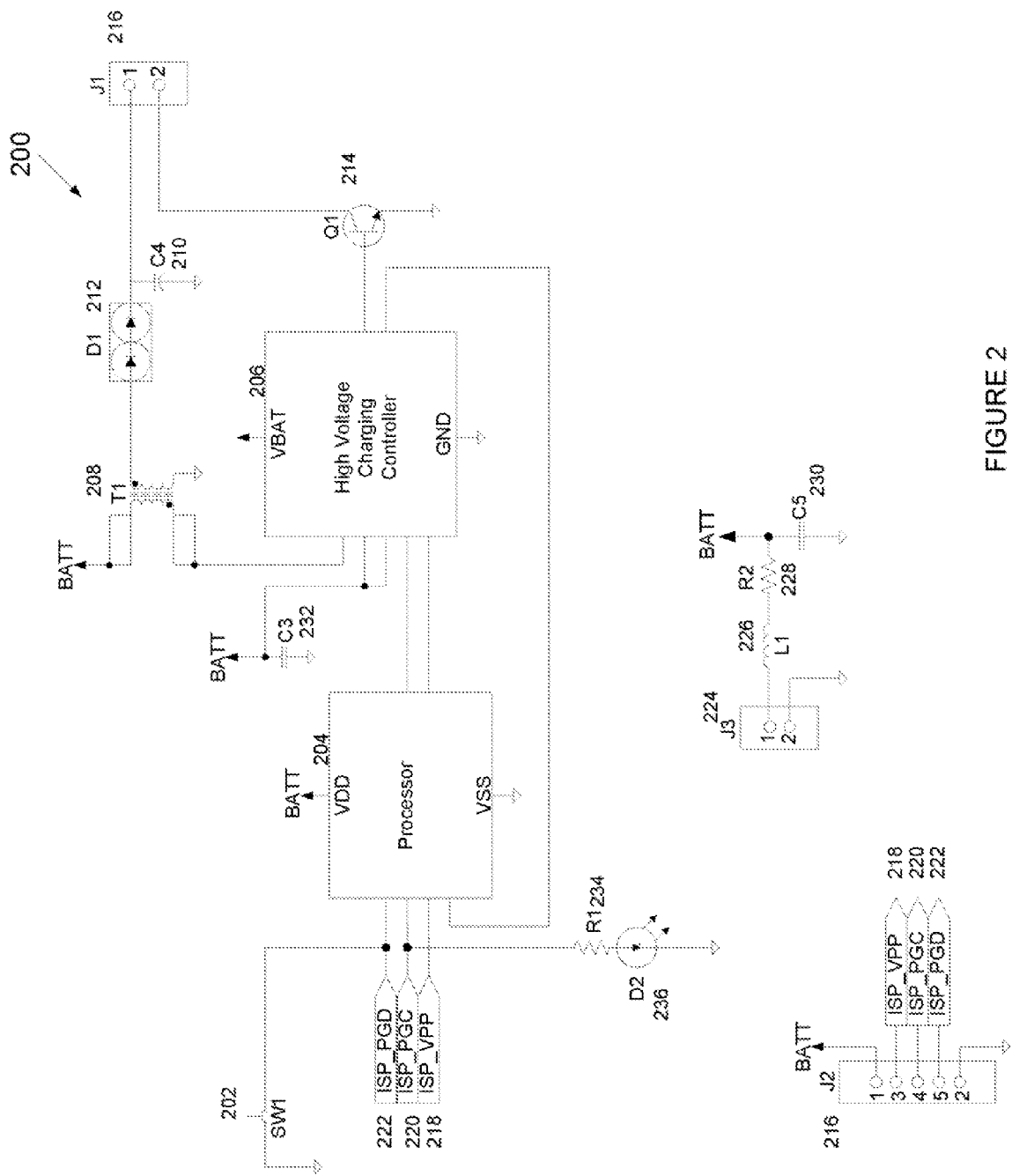
FIG. 2 is a schematic diagram of an exemplary Electronic Shark Deterrent output waveform generating circuit.

FIG. 2 is a schematic diagram of an exemplary Electronic Shark Deterrent output waveform generating circuit 200. In one embodiment, battery voltage is applied to the output waveform generating circuit 200 when an operating switch 202 is activated. Application of battery voltage (BATT) to a processor 204 initiates its internal reset, causing the processor 204 to boot up in a power conserving "sleep" mode. In sleep mode, the processor 204 outputs are configured to inactive states, causing all other components of the circuit 200 to remain idle. In this idle mode, only a clock internal to the processor 204 draws power.

The clock internal to the processor 204 operates during sleep mode such that the state of a programming data and mode toggle input signal is periodically sensed for a state change to active mode. Activating the operating switch 202 for a specified period causes the data and mode toggle input signal to the processor 204 to change state. This input state change causes the mode of the processor 204 to toggle from sleep mode to active mode or vice versa. An optional LED 236 coupled to a current limiting resistor 234 flashes to indicate a change in the processor 204 mode.

When the mode of the processor 204 changes from sleep to active mode, the processor 204 operates according to executable instructions fetched from a computer-readable medium. Examples of such media include random access memory (RAM), read-only memory (ROM), non-volatile random access memory (NVRAM), electrically erasable programmable read-only memory (EEPROM), flash memory, and the like. The computer readable medium may be internal or external to the processor 204. Although described in reference to a processor, any form of general processor, embedded processor or controller can be used within the Electronic Shark Deterrent output waveform generating circuit 200. The processor 204 may be a microprocessor, but in the alternative, the processor 204 may be any conventional processor, controller, microcontroller, or state machine. The processor 204 may also be implemented as a combination of computing devices, e.g., a combination of a Digital Signal Processor (DSP) and a microprocessor, a plurality of microprocessors, one or more microprocessors in conjunction with a DSP core, or any other such configuration. The processor 204 and the storage medium may reside in an ASIC. In the alternative, the processor 204 and the storage medium may reside as discrete components in the output waveform generating circuit 200. In another embodiment, an ASIC may comprise the output waveform generating circuit 200.

The executable instructions control one or more timers, internal or external to the processor 204, for operating signal inputs to a high voltage charging controller 206 coupled to ground by a power supply decoupling capacitor 232. In one embodiment, the high voltage charging controller 206 comprises Linear Technologies part, Linear LT-3485-1, photoflash charger with output voltage monitor and integrated Insulated-Gate Bipolar Transistor (IGBT) drive. The high voltage charging controller 206 causes current to ramp up in the primary of a high voltage pulse transformer 208 via a switched output. The ramping current may be internally monitored by a comparator within the high voltage charging controller 206. When a peak current is reached, the current ramping of the high voltage pulse transformer 208 is halted. As the current ramping halts, current is supplied to a high voltage capacitor 210, by the secondary of the high voltage pulse transformer 208. When the high voltage capacitor 210 is sufficiently charged, the IGBT drive circuit internal to the high voltage charging controller 206 causes a discharge transistor 214, to discharge the high voltage capacitor 210. Discharge transistor 214 is protected by diode 212, which prevents any flow of back current.

Instructions executed by the processor 204 synchronize the charging and discharging of the high voltage capacitor 210 across at least one pair of probes coupled to the terminals of at least one output connector 216 causing the high voltage pulse transformer 208 to create a 200V burst of approximately 33 30 us negative edge pulses lasting one second. After approximately 5 seconds, another burst of pulses is generated, thus creating the Electronic Shark Deterrent high voltage output waveform 100 of FIG. 1 or other output waveform embodiments described above. During each interval between pulse bursts, power is conserved by the output waveform generating circuit 200. In one embodiment, an average of 350 milliAmps (mA) is drawn from the output waveform generating circuit 200 during pulse bursts, while the power drawn between bursts is negligible.

The Electronic Shark Deterrent output waveform generating circuit 200 continuously outputs the bursts of high voltage pulses 100 through output connector 216 until the operating switch 202 is deactivated or battery power is removed. Sharks are deterred from the vicinity where the probes contact a body of water.

The Electronic Shark Deterrent high voltage pulse bursts have an effective range of 20 feet. Testing at depths up to 100 feet repelled sharks even in the presence of distributed fish emulsion bait, while showing no change in non-elasmobranchi organism behavior or interference with other electronic equipment including scuba gear. Testing in restricted environments such as enclosed pools resulted in temporary paralysis of hammer head sharks.

Onboard programming of the processor 204 is performed via a programming connector 216. In one embodiment, the programming connector 216 comprises a five pin connector having battery voltage supplied to pin 1, circuit ground applied to pin 2, a master clear signal 218 coupled to the processor 204 by pin 3, a clocking signal 220 coupled to processor 204 by pin 4 and program/data signals 222 coupled to the processor 204 by pin 5.

A battery input connector 224 couples supply voltage to the Electronic Shark Deterrent output waveform generating circuit 200. In one embodiment, the battery input connector 224 comprises a 2 pin connector providing battery voltage through a power supply filter formed by transformer 226, resistor 228 and capacitor 230. In one aspect, 3.0V at 225 mA are supplied to the Electronic Shark Deterrent output waveform generating circuit 200 for over twelve hours without a battery replacement.

In additional embodiments, operating switch 202 may be replaced by various other interfaces. The Electronic Shark Deterrent output waveform generating circuit 200 may be activated by a user with a button, magnet or any type of switch or user controlled switching mechanism. In other embodiments the Electronic Shark Deterrent is activated automatically or by remote control switch. For example, buoys, fish farming areas, protected swimming areas and commercial fishing and other operations may be protected by remote control or automated interfaces. Sonar sensors, underwater video cameras, digital imaging, electric field detection or fiber optic cable interfaces may be used in conjunction with an automatic or remote interface to activate the Electronic Shark Deterrent output waveform generating circuit 200.

Figure 3:
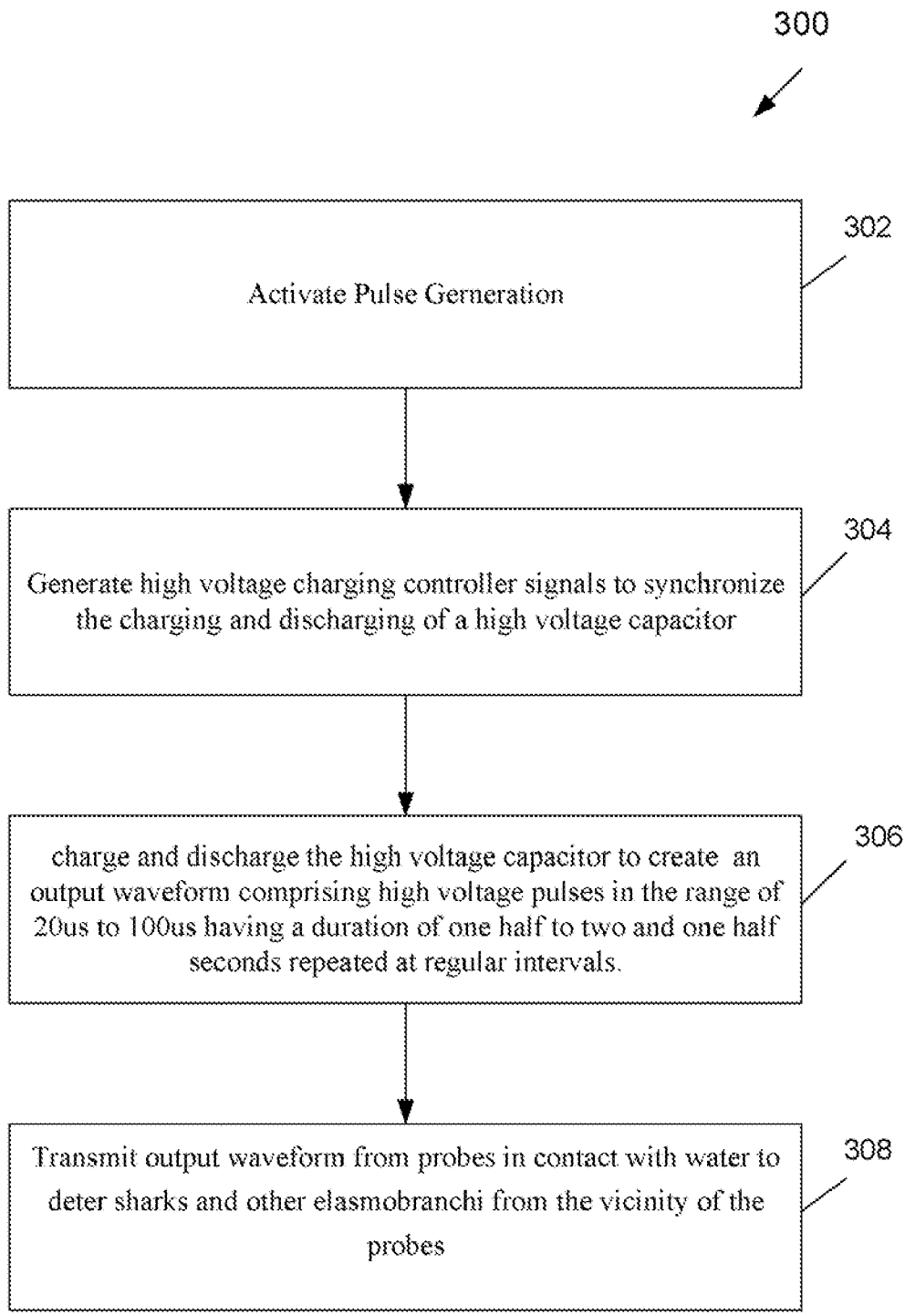
FIG. 3 is a flow chart illustrating an example method of electronically deterring sharks and other dangerous aquatic creatures.

FIG. 3 is a flow chart 300 illustrating an exemplary method of electronically deterring sharks and other aquatic creatures with a series of high voltage pulse bursts. The shark deterring methodology described herein may be implemented by suitable instructions operating on the processor 204 of output waveform generating circuit 200, but is certainly not limited to such an implementation. Any machine or computer readable medium tangibly embodying instructions may be used in implementing the methodologies described herein.

In an exemplary aspect, processor 204 executes instructions according to the steps of FIG. 3 to deter sharks and other elasmobranchi from the vicinity of the user. In step 302, pulse generation is activated. Control proceeds to step 304.

In step 304, signals are generated to cause a high voltage charging controller to synchronize the charging and discharging of a high voltage capacitor. Control flow proceeds to step 306.

In step 306, the high voltage capacitor is charged and discharged by the synchronizing signals to create an output waveform comprising high voltage pulses in the range of 20 us to 100 us having a duration of one half to two and one half seconds repeated at regular intervals. Control flow proceeds to step 308.

In step 308, the output wave form is transmitted from probes in contact with water to deter sharks and other elasmobranchi from the vicinity of the probes One skilled in the art will understand that ordering of steps illustrated in FIG. 3 is not limiting. The method is readily amended by omission or re-ordering of the steps illustrated without departing from the scope of the disclosed aspects.

Thus, a novel and improved method and apparatus for an electronic shark deterrent have been described. Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC or previously described component configurations may reside in any type of user device or consumer product.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed:

1. An electronic shark deterrent apparatus comprising:
  a low voltage power supply;
  a high voltage charging controller; a high voltage capacitor;
  at least one pair of probes, wherein the at least one pair of probes is in contact with a body of water; and
  a processor for generating signals to cause the high voltage charging controller to charge and discharge the high voltage capacitor thereby creating an output waveform for transmission from the at least one pair of probes, wherein the output waveform comprises high voltage pulses, each in the range of 20 μs to 100 μs, grouped in pulse bursts each having a duration of one half to two and one half seconds, the pulse bursts repeated at regular intervals, to deter sharks and other elasmobranchs from the vicinity of the at least one pair of probes.

2. The Electronic Shark Deterrent apparatus of claim 1 wherein the output waveform comprises pulse bursts having a duration of 1 second, which comprise thirty 33 us 200V negative edge pulses repeated after a 5 second interval.

3. The Electronic Shark Deterrent apparatus of claim 1 wherein the output waveform comprises pulse bursts having a duration of between one half to two and one half seconds, which comprise 20 us to 100 us 200-250V pulses repeated at intervals between 2 and 10 seconds.

4. The Electronic Shark Deterrent apparatus of claim 1 wherein the high voltage charging controller comprises a photoflash charger with output voltage monitor and integrated Insulated-Gate Bipolar Transistor (IGBT) drive.

5. The Electronic Shark Deterrent apparatus of claim 1 wherein the high voltage charging controller comprises Linear Technologies part Linear LT-3485-1.

6. The Electronic Shark Deterrent apparatus of claim 1 wherein the apparatus is activated by a user with a button, magnet or any type of switch of user controlled switching mechanism.

7. The Electronic Shark Deterrent apparatus of claim 1 wherein the apparatus is activated automatically or by remote control switch.

8. The Electronic Shark Deterrent apparatus of claim 1 wherein the apparatus is compact and fully portable.

9. The Electronic Shark Deterrent apparatus of claim 1 wherein the apparatus is worn on a watch sized band.

10. The Electronic Shark Deterrent apparatus of claim 1 wherein apparatus requires no external power supply.

11. The Electronic Shark Deterrent apparatus of claim 1 wherein the apparatus is embedded in a bathing suit, wetsuit, rash guard or other garment intended for water sports.

12. The Electronic Shark Deterrent apparatus of claim 1 wherein the apparatus is attached to or embedded in a life jacket, life boat, or other marine or safety equipment.

13. The Electronic Shark Deterrent apparatus of claim 1 wherein the apparatus is used in a fixed configuration to protect an area.

14. The Electronic Shark Deterrent apparatus of claim 1 wherein the apparatus is used to reduce fishing bycatch.

15. The Electronic Shark Deterrent apparatus of claim 1 wherein the processor comprises onboard programming capability.

16. A method for deterring sharks comprising:
  activating electronic pulse burst generation;
  generating signals to cause a high voltage charging controller to synchronize the charging and discharging of a high voltage capacitor;
  charging and discharging the high voltage capacitor to create an output waveform comprising high voltage pulses, each in the range of 20 μs to 100 μs, grouped in pulse bursts each having a duration of one half to two and one half seconds, the pulse bursts repeated at regular intervals; and transmitting the output wave form from probes in contact with water to deter sharks and other elasmobranchs from the vicinity of the probes.

17. A non-transitory computer readable media embodying a method for deterring sharks, the method comprising:

activating electronic pulse burst generation;

generating signals to cause a high voltage charging controller to synchronize the charging and discharging of a high voltage capacitor;

charging and discharging the high voltage capacitor to create an output waveform comprising high voltage pulses, each in the range of 20 μs to 100 μs, grouped in pulse bursts each having a duration of one half to two and one half seconds, the pulse bursts repeated at regular intervals; and transmitting the output wave form from probes in contact with water to deter sharks and other elasmobranchs from the vicinity of the probes.

* * * * *